July 9, 1968     P. R. CUTTER     3,391,993
METHOD FOR PREPARING FEED GRADE DICALCIUM PHOSPHATE
Filed March 18, 1965
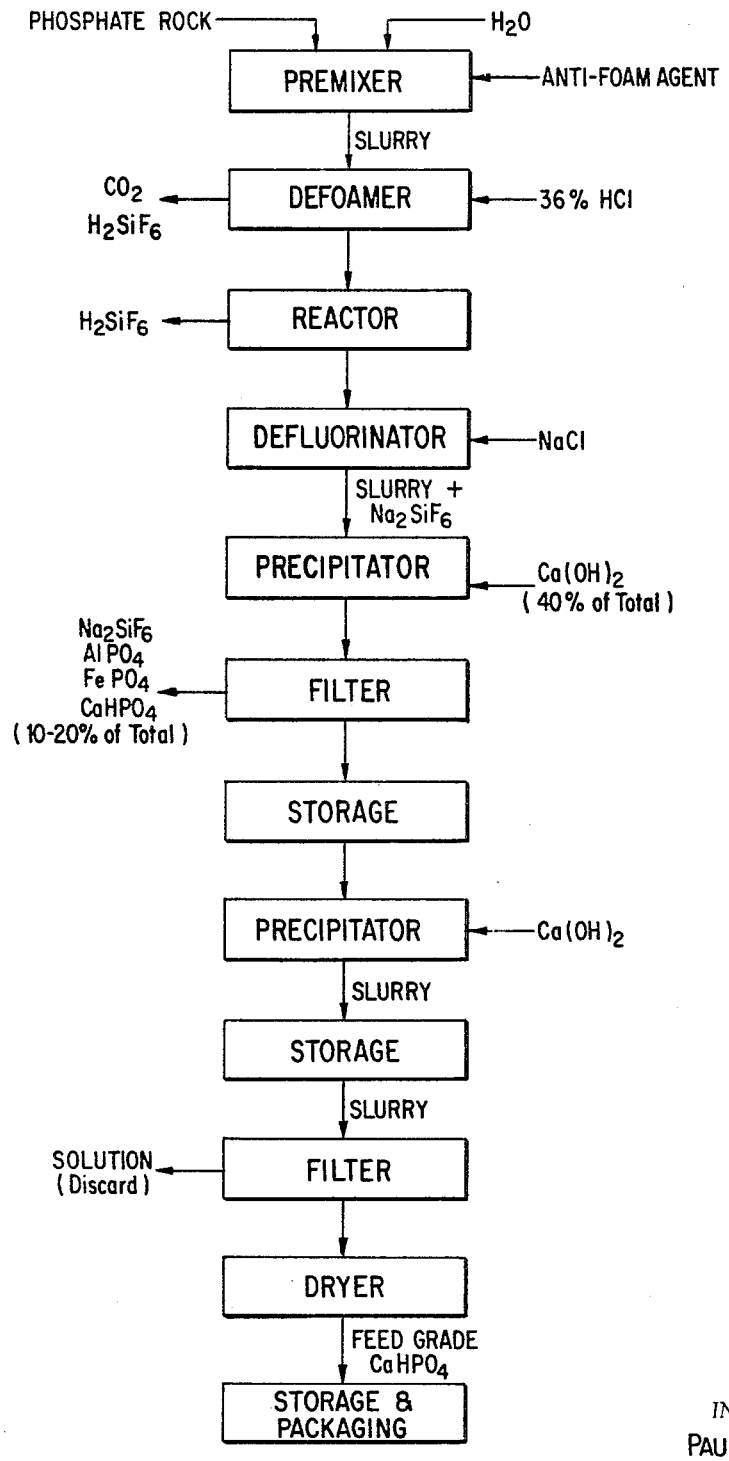
INVENTOR.
PAUL R. CUTTER
BY
*William W. Pittman*

United States Patent Office 3,391,993
Patented July 9, 1968

3,391,993
METHOD FOR PREPARING FEED GRADE DICALCIUM PHOSPHATE
Paul R. Cutter, Painesville, Ohio, assignor to Diamond Shamrock Corporation, a corporation of Delaware
Filed Mar. 18, 1965, Ser. No. 440,788
14 Claims. (Cl. 23—109)

ABSTRACT OF THE DISCLOSURE

A method for the production of dicalcium phosphate having a reduced number of steps comprises digesting phosphate rock with acid in the presence of a minimum of water, precipitating fluoride as a sodium salt and precipitating a portion of the phosphate together with most of the remaining impurities. After filtration of the foregoing, dicalcium phosphate is precipitated from the filtrate and recovered.

---

This invention relates to the recovery of phosphates, and more particularly to an improved method for the preparation of high-purity dicalcium phosphate from phosphate rock.

Recovery of phosphate values from phosphate rock is complicated by the fact that the rock contains a number of elements which interfere with the phosphate recovery operation and which are in themselves undesirable. These include iron, aluminum and fluorine, with fluorine being the most troublesome since it is difficult to remove but its presence in greater than trace amounts renders the dicalcium phosphate completely unsuitable for use where a feed grade product is desired. Many methods have been developed for removing these impurities, including a number of processes whereby they may allegedly be recovered as useful products in themselves. However, such processes involve the use of so many additional filtering, slurrying, mixing and other operations that they are almost entirely unfeasible from an economic point of view.

Three United States patents furnish particularly good illustrations of methods previously developed for removing impurities from phosphate rock reaction mixtures and the difficulties associated therewith. In U.S. Patent 2,164,627, the rock is dissolved in hydrochloric acid and the mixture is filtered. To the filtrate is added sodium chloride for the removal of fluorine as sodium fluosilicate; this impurity must then be removed by filtration before the phosphate solution can be limed for the recovery of dicalcium phosphate. This sequence of operations is not satisfactory when a product free of iron and other impurities is desired. To remove these impurities, an additional preliminary liming step must be introduced which results in the precipitation of iron phosphate and the like. These impurities must then be filtered off before the final liming steps can afford feed grade material.

In U.S. Patent 3,151,938, a method is described whereby the acid-digested phosphate rock mixture is treated with an alkaline material to increase the pH to at least 1.8. The result is the precipitation of a substantial amount of the fluoride content of the mixture. The impurities are removed by filtration and the filtrate is limed to produce dicalcium phosphate. This method, while it is quite simple in operation, at best reduces the fluorine content in commercial practice only to 0.2% of the final product, which is still too high for feed grade material. Preferably, the fluorine content of the product should be less than 0.1%, desirably about 0.05%.

A third method for producing high quality dicalcium phosphate is disclosed in U.S. Patent 3,161,466. This method involves a rather large number of filtration, recycling and mixing steps which add substantially to the cost of the process.

A principal object of the present invention, therefore, is to provide an improved and simplified method for the recovery of feed grade dicalcium phosphate from phosphate rock.

A further object is to provide a method for the recovery of dicalcium phosphate which involves a minimum number of processing steps for the elimination of a maximum quantity of impurities.

A further object is to provide a method by which by-product hydrochloric acid may be economically and conveniently employed for the recovery of dicalcium phosphate from phosphate rock.

Other objects will in part be obvious and will in part appear hereinafter.

According to this invention, dicalcium phosphate is recovered from phosphate rock by a series of steps which comprises:

(A) Digesting phosphate rock with concentrated hydrochloric acid in the presence of the minimum amount of water necessary for slurry formation, and reacting said rock and acid until substantially complete dissolution of phosphates has taken place;

(B) Reacting the mixture with a sodium salt to precipitate most of the fluorine as sodium fluosilicate;

(C) Precipitating about 10–20% of the phosphate in the mixture, together with substantially all of the remaining fluorine and other impurities, by addition of a compound selected from the group consisting of calcium hydroxide and calcium carbonate;

(D) Filtering to remove spent sand, precipiated dicalcium phosphate and iron and aluminum phosphates;

(E) Reacting the purified filtrate with a compound selected from the group consisting of calcium hydroxide and calcium carbonate to precipitate substantially pure, feed grade dicalcium phosphate, and removing and drying said dicalcium phosphate.

The invention will be more fully understood by reference to the drawing, which represents a typical method of operation according to this invention.

Referring first to the initial acid digestion step of the process, it is advisable that the phosphate rock to be treated have a tricalcium phosphate concentration of about 72% or higher. If the tricalcium phosphate content is lower than 72%, the increased percentages of aluminum and iron compounds and silica make recovery of $P_2O_5$ values considerably more difficult and less economical. The rock should be ground to a particle size such that about 50% or more passes through a 200 mesh screen.

As shown in the drawing, the ground rock is fed to a premix tank together with enough water to form a thick slurry. Preferably, a small amount of an anti-foam agent such as fuel oil or kerosene is added. The slurry is then transferred to an acid-resistant (preferably rubber- or ceramic-lined) defoamer vessel wherein it is contacted with hydrochloric acid. The defoamer vessel is fitted with a triangular foam-breaker type agitator. To avoid product loss due to foaming, it should be closed except for a vent for escape of gases.

It is an essential feature of the present invention that the $P_2O_5$ concentration of the process liquor be as high as possible at all times. For this reason, the acid added to the slurry in the defoamer vessel should be of as high a concentration as feasible, and the minimum amount to provide substantially complete dissolution of the $P_2O_5$ content of the rock should be used. It is convenient and economical to use concentrated (about 34–36%) by-product hydrochloric acid for digestion.

During the reaction of rock and acid in the defoamer vessel, gaseous carbon dioxide (from the 2–3% of carbonate usually present in the rock) and fluosilicic acid are evolved. The thick acidic slurry is then transported by air lift or other suitable means to a reactor vessel wherein it is agitated for a period sufficient to dissolve substantially all of the $P_2O_5$ content of the rock. This reactor vessel is also vented for the escape of fluosilicic acid. The total contact time of the acid with the rock should preferably be about 40–50 minutes.

In circumstances where it may be convenient or advisable to employ unground phosphate rock, the acid digestion step may be carried out by means of a continuous belt digestor as described in copending application Ser. No. 426,013, filed Jan. 18, 1965. According to this method, unground rock is fed to the lower end of an upward-moving conveyor means, preferably an acid-resistant endless belt, and is contacted with hydrochloric acid at a number of points on said belt, the acid added near the lower end of the belt being dilute and that added farther up the belt being of progressively higher concentration. By suitable adjustment of the amount of acid, a concentrated phosphate solution may be recovered at the lower end of the belt, while the spent sands and other solid materials are collected at the upper end of the belt and discarded.

After acid digestion of the rock is complete, the slurry of phosphate-containing solution and spent sand (or, if the continuous belt digestor is used, the phosphate solution without the spent sand) is transferred to a defluorinator vessel and a sodium salt is added, preferably in the form of a saturated aqueous solution. Any water-soluble sodium salt may be used, but because of its availability and cheapness, sodium chloride is preferred.

The sodium chloride (or other sodium salt) should preferably be added as a solid or, preferably, as a saturated aqueous solution in order to maintain high concentration. Since the presence of excess salt promotes precipitation of fluosilicate by the salting-out effect, it is desirable to add about twice the stoichiometric amount of sodium chloride. Under these conditions, at least about 90–95% of the solubilized fluoride will be precipitated as sodium fluosilicate. Precipitation is promoted by low temperatures, and therefore if the acid digestion mixture leaving the reactor vessel is substantially above ambient temperature (about 25–30° C.) it should preferably be cooled to about room temperature, e.g., by use of a flash cooler or by descent through a spiral cooling apparatus, before being reacted with the sodium chloride.

After the addition of sodium chloride, the solution and accompanying solids are passed (preferably by means of an air lift) into a precipitator vessel wherein they are contacted with an alkaline calcium compound in an amount sufficient to precipitate about 10–20% of the phosphate in the solution. Suitable calcium compounds include calcium hydroxide (lime) and calcium carbonate (limestone); calcium hydroxide is preferred because its use permits easy control of the reaction by monitoring of the pH of the mixture, and eliminates evolution of additional carbon dioxide gas. If calcium hydroxide is not readily available calcium carbonate may be used, but a larger reactor is then necessary to avoid loss of product by carbon dioxide evolution accompanied by foaming, and the amount of calcium carbonate to be added must be determined by weighing since the reaction is too slow to permit pH control.

Quantitative dicalcium phosphate precipitation is not dependent on the amount of calcium in the system, but rather on the system's acidity. It has been found that under the conditions of the process of this invention, quantitative precipitation occurs at a pH in the neighborhood of 5.6; this requires about 45–60 parts by weight of calcium hydroxide (or calcium carbonate stoichiometrically equivalent thereto) per 100 parts of rock digested. To precipitate 10–20% of the $P_2O_5$, a pH of about 2.9 is necessary and about 20–25 parts by weight of calcium hydroxide per 100 parts of rock is introduced.

To promote removal of the remaining small amounts of fluorine as fluosilicate, a small quantity of a silica-type filter aid is preferably introduced. Depending on the thickness of the slurry, it may also be advisable to add a non-ionic flocculating agent such as polyacrylamide, which along with the filter aid, promotes rapid and efficient filtration.

With the increase in pH of the system to about 2.9, substantially all of the heavy metal impurities (aluminum, iron and the like) are precipitated with the fluosilicate and 10–20% of the dicalcium phosphate. The mixture is now filtered for the first time. The impure product may, if desired, be recovered and processed for use as low grade fertilizer. Often, however, because of its high impurity content, it is uneconomical to recover this material at all and it is best discarded.

The purified liquor which comprises the filtrate normally contains about 60–80 grams per liter of $P_2O_5$. It is preferably passed to a storage tank which allows for flexibility in operating the system since not all stages need be operated at the same rate or at all times. The clear solution is then transferred to one or more vessels where the remainder of the necessary lime or calcium carbonate is added to furnish a pH of approximately 5.6 in order that the dicalcium phosphate will precipitate substantially quantitatively.

The aqueous suspension of substantially pure dicalcium phosphate is preferably passed from the precipitator vessel into a second storage vessel. The solid, which comprises substantially pure feed grade dicalcium phosphate and usually contains 0.04% or less fluorine, is then removed by filtration, dried and packaged. When phosphate rock containing 72% tricalcium phosphate is processed by this method, a recovery of about 60–64 parts by weight of feed grade material per 100 parts of rock may be expected.

The method of this invention provides an economical process for the preparation of feed grade dicalcium phosphate from phosphate rock and by-product hydrochloric acid. It is notable chiefly for its simplicity and the fact that manipulative operations are kept at an absolute minimum. Thus, whereas prior art methods have involved a large number of filtrations, only two such operations are necessary according to the present invention, and each affords a useful product.

The invention is illustrated by the following exemplary description. In this description, the term "parts" refers to parts by weight and may denote pounds, tons or any other unit depending on the scale of the equipment. Further, it is within the scope of this invention to operate the process continuously, whereupon the amounts designated as "parts" may refer to units of weight (e.g., pounds or tons) per day or per hour.

One hundred parts of phosphate rock containing 73.2% tricalcium phosphate is introduced into a premix vessel along with 50 parts of water and 0.3 part of kerosene as an anti-foam agent. The mixture is stirred until a thick slurry is formed and is then transferred to a ceramic-lined reactor which is vented for escape of gases and fitted with a triangular foam-breaker type stirrer. To the stirred slurry is added 60 parts of 36% by-product hydrochloric acid. Stirring is continued until the foaming subsides, after which the slurry is transferred to a second vented, ceramic-lined reactor vessel. Stirring is continued in this vessel until a total agitation time of about 50 minutes has passed.

The acid slurry is now passed to a fourth reactor and 5 parts of sodium chloride, in the form of a saturated aqueous solution, is added. Stirring is continued as sodium fluosilicate precipitates, after which the mixture of process liquor and solids is transferred to a fifth vessel for the initial liming step.

To the stirred slurry in the fifth vessel is added 20 parts of calcium hydroxide in the form of a 20% aqueous slurry. In addition, 2 parts of a silica filter aid and 20 p.p.m. of polyacrylamide are introduced, with stirring. The pH of the solution rises to 2.9 and the impurities precipitate with a portion (10–20%) of the phosphate (as dicalcium phosphate).

The slurry comprising aqueous phosphate solution, precipitated dicalcium phosphate, sodium fluosilicate and heavy metal impurities is now filtered and the solid residue is dried and bagged as low grade fertilizer (or may be discarded). The clear filtrate passes to a storage vessel from whence it is decanted to a cypress wood reactor, wherein an additional amount of calcium hydroxide (20% aqueous slurry) is added to bring the solution to a pH of 3.8. The mixture is then transferred to another cypress wood reactor and calcium hydroxide slurry is added to a pH of 5.6. The total calcium hydroxide added in these two reactors amounts to 25 parts.

The slurry thus formed is filtered and the filtrate is discarded. The solid product is dried; it comprises about 60 parts of feed grade dicalcium phosphate, containing 40% phosphorus pentoxide (18% phosphorus) and about 0.04% fluorine.

It is to be understood that the invention is not limited by the specific examples and embodiments described hereinabove, but includes such changes and modifications as may be apparent to one skilled in the art upon reading the appended claims.

What is claimed is:

1. A method for the recovery of dicalcium phosphate from phosphate rock which comprises:
    (A) Digesting phosphate rock with concentrated hydrochloric acid in the presence of the minimum amount of water necessary for slurry formation, and reacting said rock and acid until substantially complete dissolution of phosphates has taken place;
    (B) Reacting the resultant digested mixture with an excess of a sodium salt in order to precipitate most of the fluorine as sodium fluosilicate;
    (C) Precipitating a solid product containing about 10–20% of the phosphate in the mixture, whereby substantially all of the remaining fluorine and other impurities are co-precipitated, by the addition of a compound selected from the group consisting of calcium hydroxide and calcium carbonate;
    (D) Filtering to remove spent sands, precipitated dicalcium phosphate and impurities and to provide a purified filtrate;
    (E) Reacting the purified filtrate with a compound selected from the group consisting of calcium hydroxide and calcium carbonate to precipitate substantially pure, feed-grade dicalcium phosphate, and removing and drying said dicalcium phosphate.

2. The method of claim 1 wherein a small amount of an anti-foam agent is added in step (A).

3. The method of claim 2 wherein the anti-foam agent is selected from the group consisting of fuel oil and kerosene.

4. The method of claim 1 wherein the hydrochloric acid is by-product hydrochloric acid with a concentration of about 34–36%.

5. The method of claim 1 wherein the sodium salt added in step (B) is sodium chloride.

6. The method of claim 5 wherein about twice the stoichiometric amount of sodium chloride is added as a saturated aqueous solution.

7. The method of claim 1 wherein the calcium compound added in steps (C) and (E) is calcium hydroxide.

8. The method of claim 7 wherein the pH of the mixture after addition of the calcium hydroxide in step (C) is about 2.9.

9. The method of claim 7 wherein a small amount of a silica-type filter aid is added before step (D), in order to promote fluorine removal by precipitation as sodium fluosilicate and to provide for ease of filtration.

10. The method of claim 9 wherein a non-ionic flocculating agent is added along with the filter aid.

11. The method of claim 10 wherein the flocculating agent is polyacrylamide.

12. The method of claim 1 wherein the solid product of step (C) is recovered for use as low grade dicalcium phosphate for fertilizer use.

13. The method of claim 7 wherein the pH of the mixture after the addition of calcium hydroxide in step (E) is about 5.6.

14. A method for the recovery of feed grade dicalcium phosphate from phosphate rock which comprises:
    (A) Digesting phosphate rock with concentrated hydrochloric acid in the presence of the minimum amount of water necessary for slurry formation and of an anti-foam agent selected from the group consisting of fuel oil and kerosene, and reacting said rock and acid until substantially complete dissolution of phosphates has taken place;
    (B) Reacting the resultant digested mixture with a saturated aqueous solution of about twice the stoichiometric amount of sodium chloride to precipitate most of the fluorine as sodium fluosilicate;
    (C) Adding calcium hydroxide to the mixture until a pH of about 2.9 is attained, thereby precipitating about 10–20% of the phosphate content of the rock together with substantially all of the remaining fluorine and other impurities;
    (D) Adding a non-ionic flocculating agent and a small amount of a silica-type filter aid to promote filtration and fluorine removal, and filtering to remove spent sand, precipitated dicalcium phosphate and impurities and obtain a purified filtrate;
    (E) Reacting the purified filtrate with calcium hydroxide to a final pH of about 5.6;
    (F) Filtering the resulting slurry and recovering the solid product as feed grade dicalcium phosphate.

References Cited

UNITED STATES PATENTS

| 2,164,627 | 7/1939 | Seyfried | 23—109 |
| 2,857,245 | 10/1958 | Fallin | 23—109 |
| 3,033,669 | 5/1962 | Strauchen et al. | 71—39 |
| 3,151,938 | 10/1964 | Seidman | 23—109 |
| 3,161,466 | 12/1964 | Fallin | 23—109 |

FOREIGN PATENTS 484,037 6/1936 Great Britain.

EARL C. THOMAS, *Primary Examiner.*

OSCAR R. VERTIZ, *Examiner.*

L. A. MARSH, *Assistant Examiner.*